May 23, 1961 W. R. BORDER, JR 2,985,040
VARIABLE CYLINDER BORING JIG
Filed Jan. 26, 1959 3 Sheets-Sheet 1

William R. Border, Jr.
INVENTOR.

May 23, 1961  W. R. BORDER, JR  2,985,040
VARIABLE CYLINDER BORING JIG
Filed Jan. 26, 1959  3 Sheets-Sheet 2

William R. Border, Jr.
INVENTOR.

BY *Clarence A. O'Brien*
*and Harvey B. Jacobson*
Attorneys

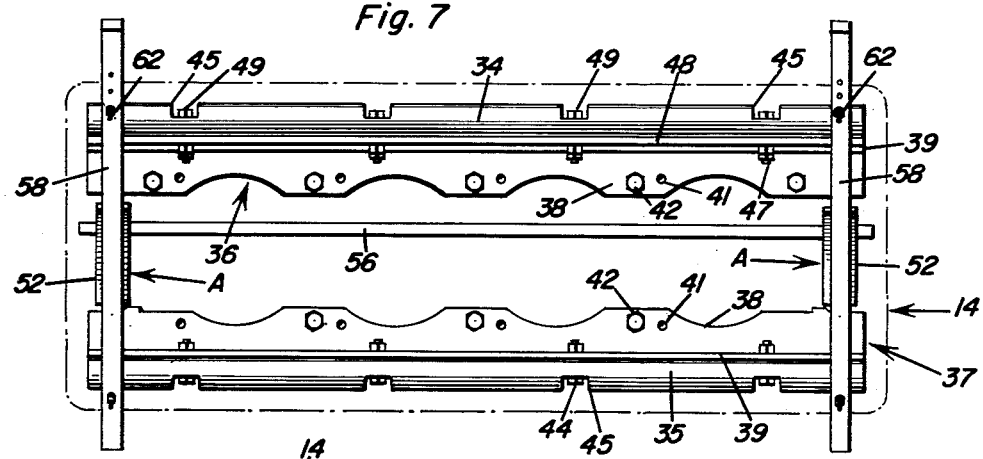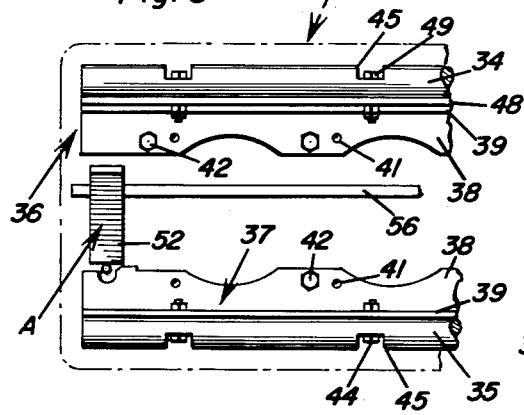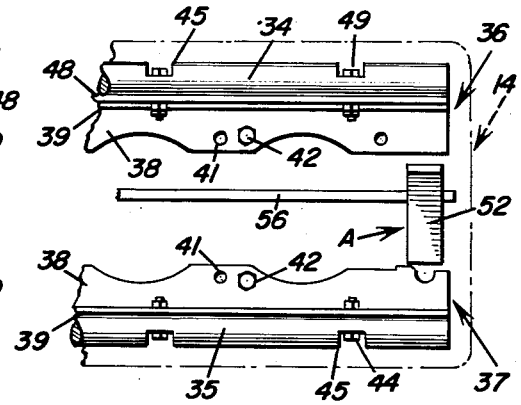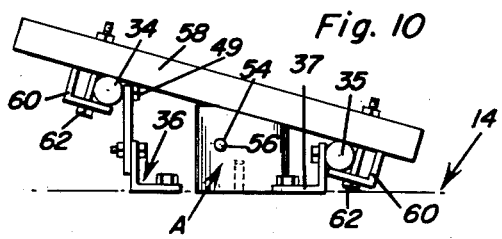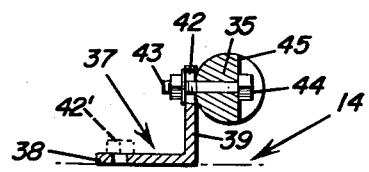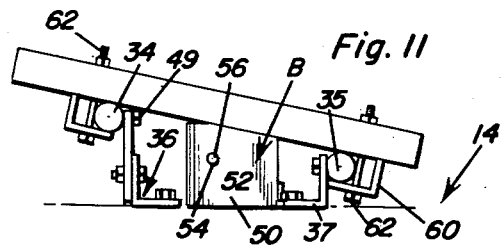

United States Patent Office 2,985,040
Patented May 23, 1961

2,985,040

VARIABLE CYLINDER BORING JIG

William R. Border, Jr., R.D. 2, Box 319, Bedford, Pa.

Filed Jan. 26, 1959, Ser. No. 788,990

3 Claims. (Cl. 77—2)

The present invention relates to certain new and useful improvements in a variable jig for a boring bar and through the medium of which a mechanic may accurately re-bore cylinders in an angle-top cylinder block without removing the cylinder head studs or valves.

More particularly the concept has to do with a jig which is such in construction that it serves as a satisfactory mount for the boring bar and base plate and does so in such a manner that the mechanic may then properly cope with the problem which has been posed as a result of the fact that numerous Ford and Chevrolet V–8 engines are designed with the top of the cylinder block not at right angles to the axes of the cylinder bores. As is well known these cylinder blocks cannot be acceptably rebored unless the mechanic resorts to the use of a correctly and accurately engineered mount or riser for the base plate of the boring bar. It is currently the practice to utilize one of the many available angle riser plates or adapters available on the market.

As the experienced mechanic knows, individual and properly angled riser plates are necessary for use under varying re-boring requirements. For example, where one riser plate is necessary for re-boring all V–8 engine blocks used in 1958 Mercury, 1958 Lincoln and the Edsel and other models where the angle is 10 degrees, a slightly larger plate, but which is basically the same in construction, may be required when the re-boring job has to do with Ford trucks. A fundamentally similar but slightly distinct riser plate would be necessary for re-boring 1958 Chevrolet models with V–8 engines. Where the bore is of a prescribed measurement the pitch or angle of the base of the boring bar may have to be set at around 15 or 16 degrees. One object of the present invention is to provide a structurally novel adaptation which, instead of being a one-piece casting, such as the presently used adapter plates and risers are, is of a sectional or knockdown construction. It follows that there is herein revealed an adapter plate on which the base of the boring bar is fastened by a single centrally disposed hold-down bolt, said adapter plate cooperating with novel riser means which is interposed between the adapter plate and the angled top of the cylinder block.

Insofar as the adapter plate per se is concerned it may be of any geometrical outline or shape. However, it is provided with perfectly flat parallel top and bottom surfaces and a central hold-down bolt providing a connection between the plate and the base of the boring bar and means is provided along marginal portions thereof to detachably and adjustably connect the plate with the plate compensating and riser means. To this end the plate may therefore be circular, square, rectangular or of any suitable marginal shape.

With respect now to the riser means or variable jig this comprises a pair of spaced parallel angle irons, said angle irons being provided with readily applicable and removable stout rods and said rods constituting tracks with which the adapter plate cooperates, the adapter plate having cleats or clamps whereby it may be adjustably fastened in a given position on the rods and the rods thus serve as adjusting rails or tracks.

Novelty is also predicated on the structural parts so far touched upon and, in addition, on the adoption and use of simple straight edges which may be temporarily fastened atop the rails or tracks, the position thereof being established by way of gauge blocks, the gauge blocks being temporarily linked together by a rod and providing the pitch and angle regulating means for the straightedges, whereby to thus set the tracks in proper relationship to support the adapter plate depending on whether it is being used for 10 degree angle work on Fords, 15 degree angle work on Chevrolet engines, 13 degrees, 16 degrees or the like.

Other objects, features and advantages will become more readily apparent from the following description and the accompanying drawings.

In the drawings wherein like numerals are employed to designate like parts throughout the views:

Fig. 6 is a similar view taken for example on the line 6—6 of Fig. 3.

Fig. 7 is a view substantially the same as Fig. 3, that is a plan view, but showing the straightedges and gauge blocks added to the illustration.

Fig. 8 is a fragmentary view at one end with the corresponding straightedge omitted.

Fig. 9 is a similar view but showing the right hand end portion.

Fig. 10 is an end view of the structural assembly seen for example in a direction from left to right in Fig. 7.

Fig. 11 is a similar view showing the same part but with a different slant or angle, that is where the degree angle is less than that depicted in Fig. 10.

Figure 1:
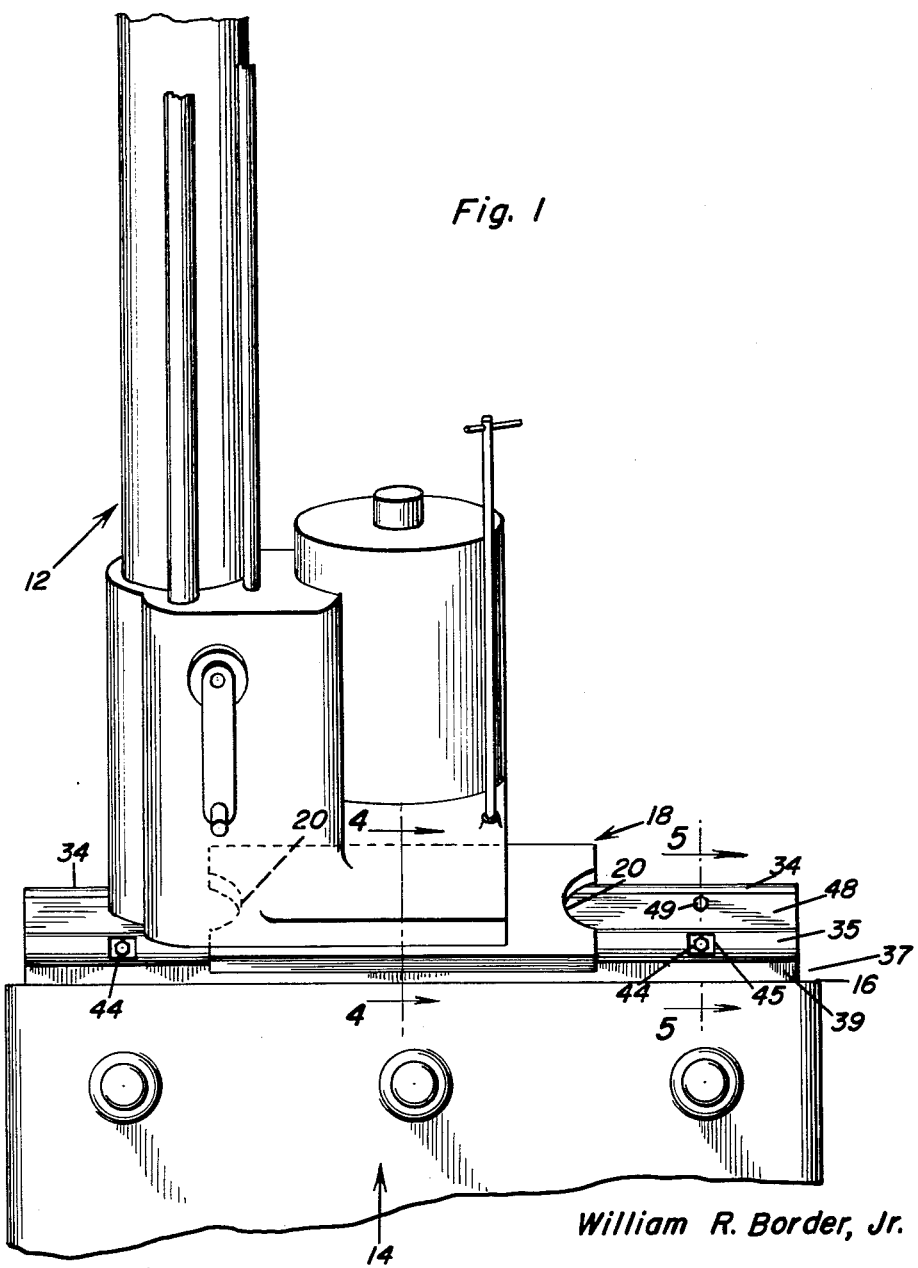
Fig. 1 is a view in elevation showing a fragmentary portion of an automobile engine or motor block, showing a boring bar, the adapter plate therebeneath, and the variable riser means or jig interposed between the adapter plate and the angled top of the cylinder block.

With reference in a general manner to Fig. 1 it will be seen that the boring bar is denoted by the numeral 12. Any mechanic familiar with this particular device would recognize it as a "Van Norman" boring bar. Since the boring bar is no part of the invention except and insofar as such a boring device is necessary in reboring cylinders, no effort will be made to dwell on the construction thereof. Nor will any detailed description be given insofar as the cylinder block 14 is concerned. It might be added that insofar as the instant invention is concerned the top 16 of the block is not at right angles to the cylinder bores as is perhaps illustrated best in Fig. 4.

Figure 2:
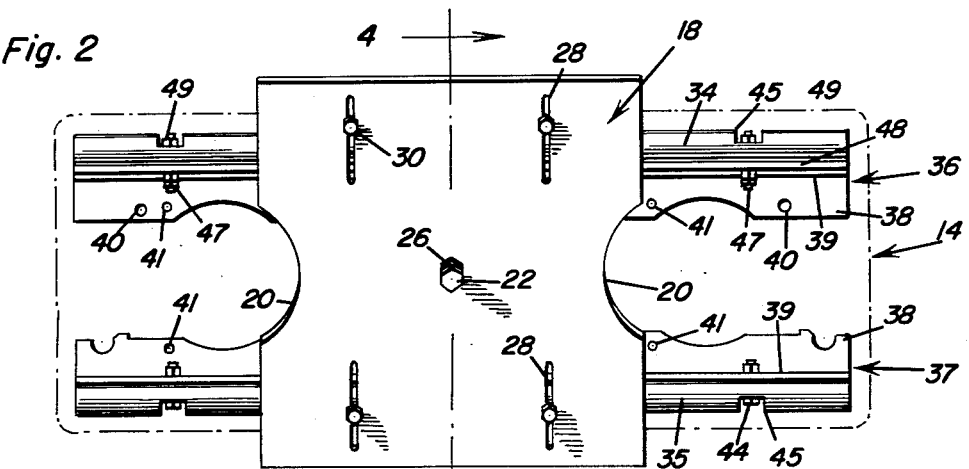
Fig. 2 is a plan view with the block appearing in phantom lines and the boring bar removed but with the invention otherwise ready to permit the boring bar to be bolted thereon and to be brought into use for re-boring the longitudinally spaced cylinders.
Figure 3:
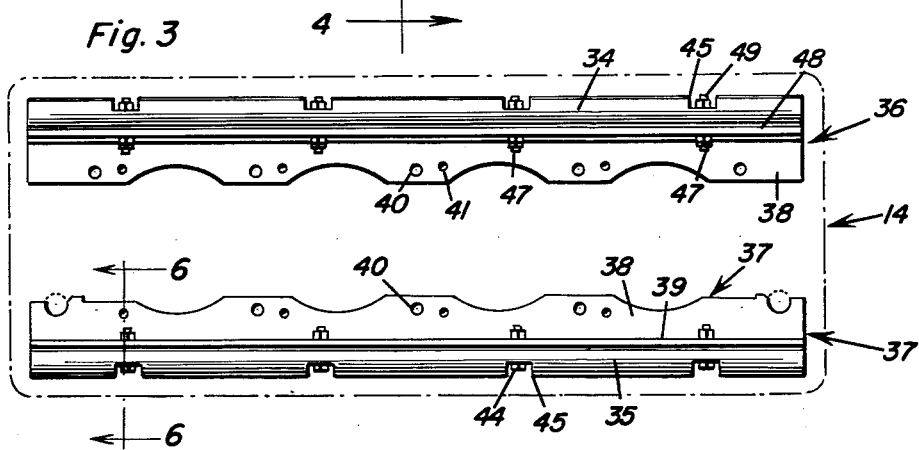
Fig. 3 is a view like Fig. 2 but with the adapter plate removed.

The adapter plate, a definite part of the invention at bar is denoted by the numeral 18. As before mentioned this may be of some other configuration insofar as the outline is concerned but as seen in Fig. 2 the plate is generally rectangular and has diametrically opposite clearance notches 20. At the center thereof (Fig. 4) there is an attaching and hold-down bolt 22 with its assembling and retaining nut 24 and a lock nut 26. This means is provided for properly joining the base of the boring bar 12 to the plate so that the adapter plate then becomes supporting and angling means for the boring bar. At corner portions the adapter plate is provided with slots 28 to accommodate bolt and nut means 30 which are used to mount the L-shaped cleats or angle clips 32 adjustably on the underside of the adapter plate.

Figure 4:
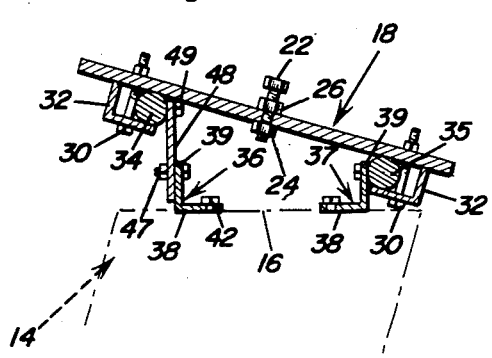
Fig. 4 is a section on the line 4—4 of Fig. 2, looking in the direction of the arrows (attention is also directed to the corresponding section line 4—4 of Fig. 1 but with the boring bar in position).
Figure 5:
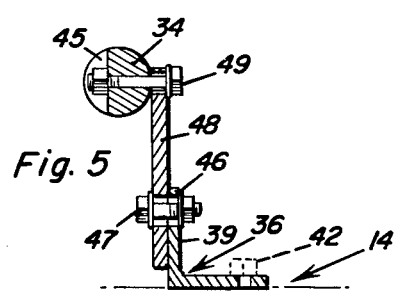
Fig. 5 is a section on an exaggerated scale taken on the vertical line 5—5 of Fig. 1.

The adapter plate thus constructed is detachably mounted on the angle riser means or jig which is interposed as seen in Figure 4 between the plate and the top 16 of the cylinder block 14. Broadly, this novel knockdown variable jig is characterized by tracks or rails which are horizontally disposed and in spaced parallelism to permit the cleats 32 to be mounted shiftably thereon and to allow the adapter plate to be adjusted in a horizontal direction to shift the boring bar from one position to another. More specifically these rails or tracks are heavy-duty cylindrical or equivalent rods 34 and 35. The rod or rail 34 may be said to be the upper one and 35 the lower one in the arrangement depicted in Fig. 4. I use a pair of spaced parallel coplanar angle irons 36 and 37 also as seen in Fig. 4 and these constitute the devices for assembling and holding rails or rods 34 and 35 in the manner illustrated. Each angle iron has a horizontal flange 38 and a vertical flange 39 and the horizontal flanges are provided with stud holes 40 and 41 which are selectively used to accommodate headed studs 42 as shown in phantom lines which function to hold the angle irons in functioning positions. The vertical flange 39 of the angle iron 37 (Fig. 6) has a slot 42' therein to accommodate a nut equipped bolt 43, the headed end 44 of which is accommodatingly fitted in a clearance or recessing notch 45 in the aforementioned rod or track 35. A similar arrangement is used in Fig. 5. However, and here the elongated bolt hole or slot is denoted at 46 and this is in the vertical flange 39 to accommodate the nut-equipped bolt 47 which in this instance serves to attach an adjusting or extension plate 48 to the flange 39. The plate 48 in turn is provided with an adjustable and removable nut equipped bolt 49 which is the means for adjusting the rail or bar 34. By examining Figs. 5 and 6 in conjunction with Fig. 4 it will be evident how the two angle irons 36 and 37 are bolted in place and serve as mounting means for the rods or track rails 34 and 35 and how the latter are adjusted up and down relative to each other to reside in the intended plane and to support the detachable and adjustable adapter plate 18 in a manner seen in Fig. 4.

It is desirable in a construction of the type shown and described to be able to set the parts so that the pitch or degree of angle is determinable and regulatable and can be established. This is brought out in part in Figs. 10 and 11 wherein it will be seen that in order to regulate and then establish the positions of the track rails 34 and 35 and consequently the pitch or angle of the adapter plate thereon gauge blocks are preferably used. For example there is a gauge block A for a 16° adjustment as seen in Fig. 10 and a similar gauge block B for an adjustment to a lesser angle or 10° angle. Basically, however, the gauge blocks are the same in that each block is of precision made form and is denoted at 50, the same having its upper end disposed on the desired slant or angle as at 52. The holes 54 in the block serve to accommodate a tie rod 56 and the rod is of course not permanently joined to the block. In other words, it serves when the blocks A or B are used and it makes it possible to conveniently set the blocks in position atop the cylinder block between the horizontal flanges 38 of the respective angle irons 36 and 37. Once the blocks are in position then the straightedges 58 are brought into play. Each straightedge is a simple precision made elongated bar metal the underneath side of which rests on the slanting surface 52 of the gauge block to ascertain and set the high and low positions of the respective track rails 34 and 35. Each straightedge is provided with an L-shaped clamping clip 60 secured in place by a nut equipped bolt 62. Consequently, as is evident from the drawings, a riser means (comprising the angle irons 36 and 37, rail 34 and 35, and extension or raising and lowering plate means 48) acting in conjunction with the adapter plate 18 provides a highly satisfactory construction which makes it possible to employ the same means for most models of both Fords and Chevrolets using V–8 engines.

The procedure of usage of the variable cylinder boring jig would be thus:

Thoroughly clean the top of the motor block on which the cylinder jig is to be used to remove any carbon deposits or foreign matter or raised portions of the block thereon that would prevent the top of the block from being flat and true which is normal procedure in any reboring or motor overhaul operation.

Attach the angle irons 36 and 37 to the top of the block with due respect to the cutout portions in the angle to permit free clearance of the cylinder so as to not interfere with the boring for operation.

Attach plate 48 to the angle 36, then attach the two track rails 34, 35 with bolts or nuts and first secure them so they are free to move up or down to provide free alignment with angle gauge blocks 52 and straightedge 58. Place the respective angle block 52 on the motor block so as to have the angle blocks 52 parallel to each other by a tie rod 56. The angle blocks are located to the top of the block with due respect to various stud bosses or dowel pins in the block.

Place the straightedge 58 over the top of the angle gauge and attach the clamping clips 60 with bolt 62 and allow the straightedge to rest on the top surface of the angle gauge 52 and check some with a feeler leaf of .001 thickness to make sure that the angle block is resting properly on the top of the block and that straightedges 58 are resting properly on the top of angle block 52. Then, firmly tighten all bolts on track rails 34, 35 to secure rails to plate 38 and angles 36, 37.

Next remove straightedge 58 and angle block 52 and tie rod 56. Place the adapter plate 18 on the track rails 34, 35 and locate it so as to provide a free clearance over the desired cylinder to be bored with attaching clips 32 and bolts 30. Place the boring bar atop the adapter plate 18 and secure to mounting bolt or stud 22. Run the column of the boring bar down into the cylinder to be bored and center the bar in the cylinder, then tighten the clamping arrangement of the boring bar to bolt or stud 22, remove the boring bar column from the cylinder, place the cutting bit in the boring bar, and the cylinder is ready to be bored. After the one cylinder has been bored the mechanism may loosen the clamping clips 32 and slide the adapter plate 18 and boring bar over atop the next cylinder, center the bar in the cylinder, tighten clamping clips 32 and you are ready to bore again continuing on until the desired cylinders have been bored.

Once the set up has been made as previously mentioned to bore the cylinder on the opposite side of the block it is only necessary to remove the boring bar, adapter plate 18 and then remove the cap screws in the angle irons 36, 37 that hold them to the top of the block and then transfer the whole arrangement to the opposite side of the block and place the bolts in the angles and secure to the top of the block, place the plate 18 atop of the rails 34, 35 and proceed as before outlined in the boring of the cylinders on this respective side.

It is possible to have angle bars 36, 37 of various sizes and shapes to allow track rails 34, 35 to be mounted to different height and thickness plates 48 to provide a universal and variable cylinder boring arrangement.

Using the invention disclosed insures original factory cylinder alignment. Considerable and valuable time and labor is saved and instead of having to have on hand numerous angle riser plates which are now of one piece construction and on the market, the instant convertible or variable boring jig is readily and satisfactorily usable.

Once a mechanic has employed this jig, regardless of what other implements and methods he heretofore followed, he will fall in line with the contention that the invention satisfactorily serves the purpose for which it is intended.

With this highly practical and efficient and variable jig in hand one does not have to purchase, as is frequently the situation, a boring plate for each angle block inasmuch as the facilities available offer a reasonably extensive range of utility. The adapter plate has a precision finished top surface and a precision flat parallel bottom surface. With this invention it is practical with different angle gauge blocks to re-bore motors within the capacity of the boring bar which is at the time being used. This being true regardless of cylinder spacing or size and the ability and skill of the operator using the jig.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Hold-down and fastening means for an adapter plate adapted to be removably mounted atop a cylinder block the top of which is not at customary right angles to the axes of the cylinder bores; comprising a first elongated angle member adapted to be removably anchored on the top of said block, a first elongated rod constituting a track rail, means adjustably bolting said rod on a vertical flange of said first angle member so that the top of the rod may be located in a plane above the upper edge of the vertical flange, a second elongated angle member of corresponding construction adapted to be opposed in parallelism to the first named angle member, an extension plate superposed against the vertical flange of the second named angle iron and adjustably and detachably connected thereto, a second rod providing a track rail and corresponding to the first named track rail adjustably mounted on the upper portion of said extension plate, the top of said rod being disposed in a plane above the upper edge of said extension plate, and an adapter plate having an underneath portion resting simultaneously on said rails and provided with clip means at its marginal portions whereby the latter may be removably and adjustably clipped on and slid back and forth on said rails, said adapter plate being centrally provided with means whereby the base of a boring bar may be mounted thereon, said rods having rounded top surfaces on which said plate rests for uninterrupted sliding adjustment.

2. The structure defined in claim 1 wherein the clip means comprise L-shaped members secured to said adapter plate, one leg of each L-shaped member extending normal to said adapter plate and the other leg extending over one of said rods.

3. The structure defined in claim 1 wherein said first and second angle members have substantially horizontal flanges extending toward one another, said flanges having opposing arcuate recesses in their edge portions for partially circumscribing the cylinder bores.

References Cited in the file of this patent

UNITED STATES PATENTS

| | | |
|---|---|---|
| 307,321 | Osborn | Oct. 28, 1884 |
| 1,669,194 | Froussard | May 8, 1928 |
| 1,848,725 | Johnson | Mar. 8, 1932 |
| 2,266,113 | Wiss | Dec. 16, 1941 |
| 2,373,341 | Rowe | Apr. 10, 1945 |
| 2,567,517 | Keebler | Sept. 11, 1951 |
| 2,738,625 | Strnad | Mar. 20, 1956 |
| 2,748,459 | Orr | June 5, 1956 |
| 2,816,489 | Robbins et al. | Dec. 17, 1957 |